United States Patent
Fuselier

[15] 3,679,337
[45] July 25, 1972

[54] MANUFACTURE OF PLASTIC ARTICLES

[72] Inventor: Claude Fuselier, St. Jean de Moirans 38, France

[22] Filed: April 16, 1970

[21] Appl. No.: 29,194

[30] Foreign Application Priority Data

April 18, 1969 France....................................6911370
Dec. 5, 1969 France....................................6942262

[52] U.S. Cl..............................425/130, 425/117, 425/163, 425/435
[51] Int. Cl...........................................................B29c 5/00
[58] Field of Search ...............................18/26 RR, DIG. 50

[56] References Cited

UNITED STATES PATENTS 3,507,011  4/1970  Pellicer et al........................18/26 RR
R25,587   6/1964  Wiltshire..........................18/26 RR X

*Primary Examiner*—H. A. Kilby, Jr.
*Attorney*—Sughrue, Rothwell, Mion, Zinn & Macpeak

[57] ABSTRACT

Apparatus for manufacturing hollow plastics articles using a centrifugal mould. A polymerizable mixture of accelerated and catalysed resins is introduced into the mould through two or more nozzels, the component resins of the mixture being fed through separate nozzels. The jets of resin issued from the nozzels are directed to a rotary disc mounted at the forward end of a reciprocating arm bearing the nozzels. The arm is movable into and out of the mould by means of a carriage. Various internal mould configurations may be provided for the production of articles of different section.

11 Claims, 20 Drawing Figures

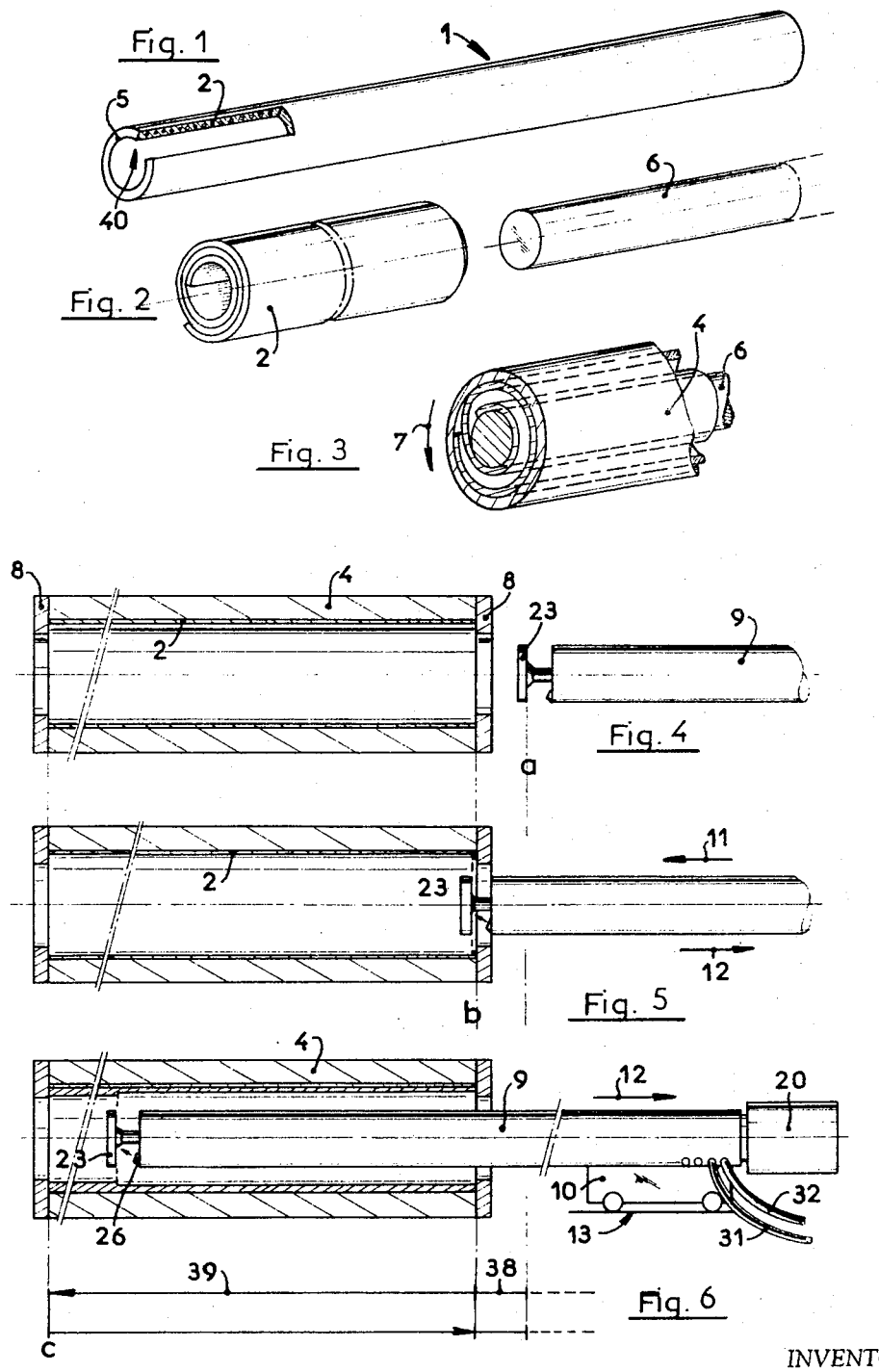

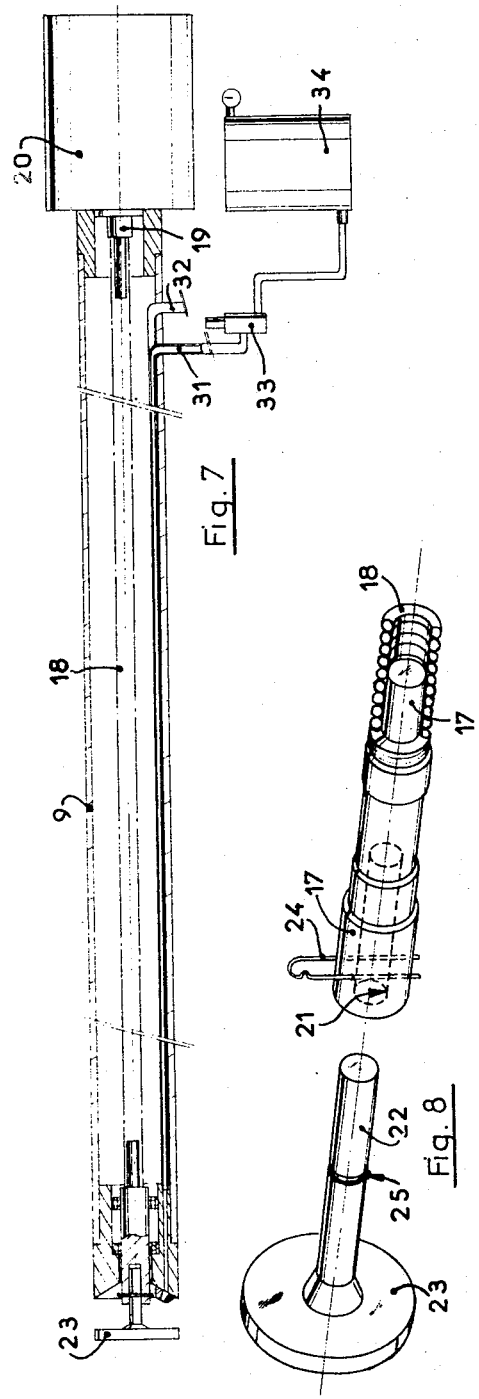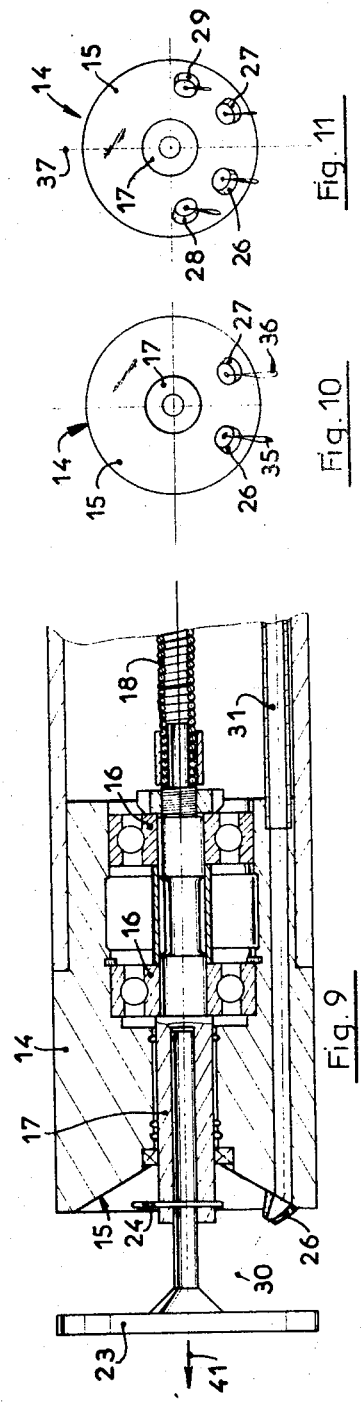

MANUFACTURE OF PLASTIC ARTICLES

The present invention relates to a new device for the manufacture of articles, e.g. tubes, of stratified and centrifuged plastics material.

It is known to use for this purpose a cylindrical mould rotated about its axis, to dispose within this mould a reinforcing fabric or felt of glass fibers, and then to pour into the rotating mould a mixture of two or more resins, which the centrifugal force applies to the inner wall of the mould where it impregnates the glass fiber reinforcement. The difficulty lies in the choice of means used for pouring the liquid resin into the mould. In fact, the liquid introduced into the mould is obtained by mixing an accelerated resin and catalyzed resin. This product only remains liquid for several minutes after being mixed and then solidifies by polymerization. The mixture of the two resins takes place outside the machine, such that there is then only a very short time available for introducing it into the mould and pouring it in. It is known to use for this, either a long spout in the shape of a gutter which is engaged in the mould for pouring, or a long arm provided with a conveyor belt, which is progressively advanced inside the rotating mould. Finally it is known to force the resins into the mould by means of mobile compressed air guns, the jets of which are perpendicular to the axis of the mould. These known systems have three serious disadvantages.

Firstly, the distribution of the mixture is not homogeneous over the length of the mould.

Then the measuring of the two basic resins constituting the mixture is carried out once and for all at the beginning and outside the machine, such that this measurement is neither accurate nor permanent.

Finally and above all, the mixture solidifies rapidly in the spout or on the conveyor of the arm, which makes it necessary, after each operation, to carry out a long and difficult cleaning operation.

The object of the present invention is to avoid these disadvantages by using a method and an installation of new type for automatically solving the problems of measurement of the mixture and of the distribution of the resins, by means of a single device which necessitates practically no cleaning.

The method according to the invention for introducing to a centrifugal mould, a polymerizable mixture of accelerated and catalyzed resins, is characterized in that there is advanced into the rotating mould, several nozzles each supplied from the outside with the basic resins, the jets of the nozzles being directed towards a rotating disc placed in front of them. The axis of rotation of this disc preferably coincides with that of the centrifugal mould. Since each nozzle is supplied with a basic resin, it will be understood that the measurement may be effected at any time from the outside, independently on each of the nozzles. In addition, since the mixture of the resins is obtained at the last moment, when the jets hit the rotating disc, it will be seen that only the latter risks becoming fouled; in actual fact it will be noted that the centrifugal force is sufficient to clean it automatically and permanently. It will be noted that this jet at the outlet of the nozzle is obtained by the pressure exerted on the resins without any action by compressed air.

For large diameters, there may be added to this device a glass cutter (of known type) thus permitting the use of thread in place of matte and continuous filling of the mould (simultaneous feeding of glass fibers and resin).

A device according to the invention for carrying out the method which has been described, comprises a centrifugal mould of known type, and it is characterized in that it comprises, in addition, a tubular arm supported at the rear end by a carriage travelling on a roller-track through the intermediary of a system coupled to a motor, which is able to advance or withdraw its front end co-axially inside the rotating mould, this arm being provided at the end in question with several nozzles, in front of which there rotates a transverse disc, the axis of which is co-axial to that of the arm, whereas at the rear end of this arm there is located a motor for rotating the disc, and pipes each connected, at one end to one of the nozzles, and at the other end to a circuit for supplying one of the basic resins of a polymerizable and hardening mixture. This supply circuit may be constituted, for each nozzle, by an electrically-operated distribution valve connected, either to a pressure chamber, or a pump.

The motor for driving the disc may be pneumatic or electric, its connection to the rotating shaft of the disc being preferably ensured by a flexible transmission. The machine may be completed by micro-switches mounted in a stationary manner and distributed along the path of the carriage. Thus, the different stages of the operation are automatically initiated, namely the reversal of the direction of movement of the carriage, the initiation or interruption of the supply of resin to each of the nozzles.

For certain qualities of product, it is sufficient to use two nozzles, one of which is supplied with an accelerated resin, whereas the other receives a catalyzed resin. The carriage makes a return journey and the quantity of mixture introduced is sufficient to form the walls of the desired article. In other cases, there may be used four nozzles, two of which introduce different accelerated resins, whereas the other two are supplied with different catalyzed resins. During a first return journey of the carriage, two of the nozzles provide an accelerated, catalyzed mixture which impregnates the glass fiber support and forms the main part of the object in stratified and centrifuged plastic. Then, during a second return journey, there is supplied through the two other nozzles a mixture of a different quality which forms an inner lining in order to protect the walls of the finished article. This is an advantage in certain applications where the centrifuged product has to be protected, for example, against chemical corrosion.

According to another possible feature of the invention there is used a centrifuged mould, the inner impression of which is defined by a wall different to that of a cylinder of revolution.

A first variation of this system consists in choosing for the impression a prismatic shape, i.e., the polygonal cross section of which remains constant over the entire length. The impression can also be given a truncated cone shape, it being understood that the cross section of the cone is not necessarily circular.

Another feature of the invention consists in varying, according to an amount fixed in advance, the quantity of resins introduced from one place to another of the mould by the rotating disc of the arm. This variation may be obtained:

either with a constant supply and variation of the speed of movement of the arm;

or with a constant speed of movement of the arm, and variation of the supply of resins.

This variation of local flow makes it possible to manufacture either articles with a variable cross section, for example, conical, or centrifuged articles, whose thickness of the wall is varied locally, for example, in order to produce internal or external flanges.

The invention is further described by way of example with reference to the accompanying drawings, in which:

FIG. 1 is a perspective view, partially in section, of a tube of stratified plastics material, manufactured according to the invention;

FIG. 2 illustrates diagrammatically the preparation of the glass fiber reinforcement;

FIG. 3 shows the positioning of this reinforcement inside a rotating centrifugal mould;

FIG. 4 shows the head for measuring, mixing and distributing according to the invention before its entry into the rotating mould;

FIG. 5 shows this head as it begins to introduce the mixture of resins on entry into the mould;

FIG. 6 shows the carriage during its return journey;

FIG. 7 is an axial section of an arm according to the invention;

FIG. 8 is a perspective view illustrating the principle of assembling the removable rotating disc;

FIG. 9 is an axial section of the end of the assembled arm;

FIG. 10 is a front view of the arm, the disc of which has been removed, as used for spraying with two nozzles;

FIG. 11 is a similar view of the arm employed for spraying with four nozzles;

Figure 12:
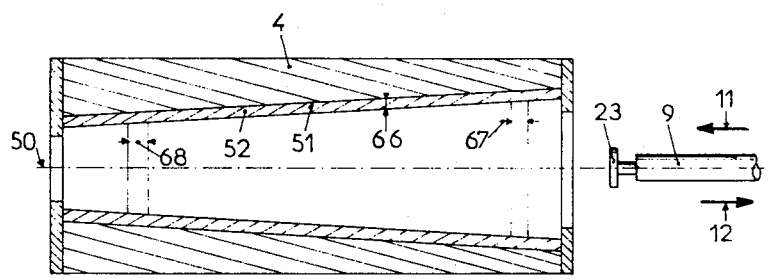
FIG. 12 is an axial section of a centrifuging installation for carrying out the method according to the invention with a view to producing a centrifuged hollow frustum of a cone.

The method and the machine according to the invention are intended for manufacturing articles of stratified and centrifuged plastics material. An article of this type may be constituted for example by a tube 1 of the type illustrated in FIG. 1. This tube is formed from a fabric or felt 2 of glass fibers (FIGS. 2 and 3) which is placed inside a rotating mould 4 and impregnated with a mixture of resins which polymerize and harden. After the mould is removed, the resins form the body of the wall 5 of the tube, this wall being reinforced internally by the glass fibers 2.

For this, it is known to use a metallic, tubular mould 4 which is rotated and inside which there is introduced the felt or fabric 2 previously wrapped around a rigid core 6 (FIG. 2). Due to the rotation of the mould 4 in the direction of arrow 7 (FIG. 3) the felt or fabric 2 unwinds and leaves the core 6 to lie against the inner side of the mould 4.

After this preparation, the mould 4 is as shown on FIG. 4. At its two ends, it comprises rings 8 intended to form the end faces of the tube 1.

According to the invention, in addition, there is provided on the machine, a tubular arm 9 which is supported at one end by a carriage 10 (FIG. 6). The arm 9 is held on the axis of the rotating mould 4. The carriage 10 carries out a reciprocating motion (arrows 11 and 12) on a stationary roller track 13.

At the front the arm 9 is closed by a part 14, preferably hollowed out to form a concave end face 15 (FIG. 9). This part 14 comprises an axial housing in which are housed two ball-bearings 16 which support a rotating bush 17. At the rear, this bush 17 is connected to a flexible driving shaft 18 of known type which constitutes a flexible connection under cover. The other end of this connection is coupled to the rotating shaft 19 of a motor 20. This motor may be electric or pneumatic and it is able to rotate the bush 17.

The front, the bush 17 has a cylindrical, axial bore in which engages a rod 22 integral with and disposed normally to a metallic disc 23. In order to ensure the locking of the rod 22 in the bush 17, this bush 17 is provided with a pin 24 resiliently engageable in a groove 25 of the rod 22.

The disc 23 may be flat, convex, concave or provided with helicoidal or spiral parts in relief.

In addition, there are provided on the concave side 15 of the part 14, nozzles 26 of the type shown is FIG. 9. There may be provided one pair of nozzles 26 and 27 (as in FIG. 10) or two pairs of nozzles 26, 27, 28, 29 (as in FIG. 11) or a greater number as desired. The axes 30 of these nozzles (FIG. 9) converge in the direction of the disc 23.

Each nozzle 26 is connected by a pipe such as is indicated at 31 or 32, to a supply circuit for the basic resin. This circuit may comprise an electrically operated distribution valve 33 (FIG. 7) and a pressure chamber 34 which contains the desired basic resin. Naturally, the chamber 34 may be replaced by a supply pump, or the electrically operated valve may be replaced by any other device for opening and closing the resin circuit.

When two nozzles are present (FIG. 10) an accelerated resin is supplied to one of the nozzles 26 or 27, whereas the other is supplied with a catalyzed resin. Consequently, it is understood that if drops of liquid 35 or 36 fall from the nozzles, these drops fall separately, side by side, and their resins never mix on the machine. There is thus avoided the formation of a hardened mixture outside the mould thus avoiding the necessity of cleaning the installation.

Where four nozzles are used (FIG. 11) there is sprayed through the nozzles 26 and 28, located on the same side, for example two different accelerated basic resins, whereas the corresponding catalyzed resins are sprayed through the nozzles 27 and 29 on the other side. Consequently, even if drops falling from two nozzles located on the same side of the vertical plane 37 were to mix, there would never result the formation of a mixture which would harden and thus foul the machine. In fact, the mixture of two accelerated resins supplied through the nozzles 26 and 28 would not give rise to any chemical reaction, like the mixture of the two catalyzed resins sprayed through the nozzles 27 and 29.

Micro-switches (now shown) are placed along the stationary roller track 13 (FIG. 6) in order to initiate automatically the different operating stages as the carriage 10 advances or returns.

The operation is as follows:

At the beginning, (FIG. 4), the mould 4 rotates, lined internally with the glass felt or fabric 2. The arm 9 and the spraying disc 23 are stationary. The carriage 10 and consequently the arm 9, is moved forwards in the direction indicated by the arrow 11 (FIG. 5). This automatically brings about the rotation of the disc 23. When the arrangement has moved the distance 38 (FIG. 6) which is sufficient to bring the disc 23 to the opening of the mould (FIG. 5), the supply of resins through the nozzles 26 and 27 which spray the liquid jets onto the rotating disc 23 is initiated. The two liquids are immediately mixed and sprayed on to the glass reinforcement 2 which they impregnate. It is thus seen that the mixture of the two basic resins is effected on the spot, at the last moment.

When the spraying disc 23 arrives at the other end after having covered a distance 39 (FIG. 6) a micro-switch (now shown) on the roller track 13 causes the reversal of direction of travel of the carriage 10. The carriage moves back in the direction of arrow 12 and a second layer of mixed resins is sprayed onto the inner face of the rotating mould 4. When the arrangement returns to the position shown in FIG. 5, the supply to the nozzles 26 and 27 is stopped. Next, the rotation of the disc 23 may be stopped (initial position according to FIG. 4).

Finally, if it is desired to coat the inner face 40 (FIG. 1) of the tube 1 with a resin of different quality, one proceeds to a new return journey of the carriage 10, this time spraying another accelerated resin through the nozzle 28 and another catalyzed resin through the nozzle 29 (in the case of a head with four nozzles, FIG. 11).

After the machine has stopped, it is sufficient to pull the disc 23 in the direction of the arrow 41 (FIG. 8) in order to extract it from the rotating bush 17. The cleaning is thus made much easier, and is limited to the disc 23 which is the only part likely to become fouled. In fact, practice has shown that the disc 23 does not become fouled.

Figure 13:
FIG. 13 is a perspective view of the article obtained in this way.
Figure 14:
FIG. 14 shows a prismatic article of hexagonal section according to the invention.

There is shown in FIG. 12, an installation having the same features as previously concerning the arm 9, whereas by way of contrast the shape of the mould 4 rotating about the axis 50 is different. This mould 4 has an inner shape whose wall 51 is not necessarily a cylinder of revolution. In other words this wall 51 may define a truncated cone of revolution as in the example of FIG. 12, if it is desired to mould by centrifugation a hollow object 52 (FIG. 13). By way of contrast, the wall 51 of the mould shape 4 must be hexagonally prismatic if it is desired to mould the object 53 illustrated in FIG. 14 or even cylindrical or conical with a cross section corresponding to the various shapes. It may be, for example, an oval shape 54 (FIG. 15) or a shape 55 with channels or recesses (FIG. 16).

Figure 17:
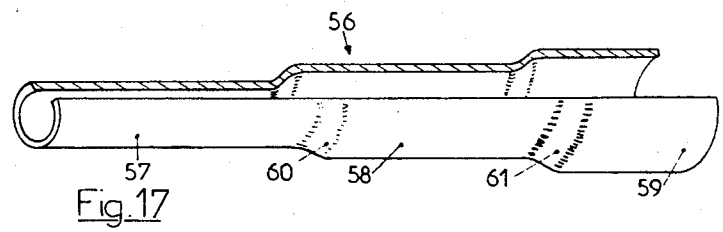
FIG. 17 shows a hollow part according to the invention, the diameter of which varies stepwise.

The wall 51 of the mould shape 4 may in addition define several cylindrical regions of different diameter connected by shoulders or by truncated portions, for example in order to manufacture a hollow article 56 of the type illustrated in FIG. 17. This article (mast, beam or pylon) comprises cylindrical sections 57, 58, 59 of different diameters, connected by frusto-conical sections 60 and 61.

Figure 18:
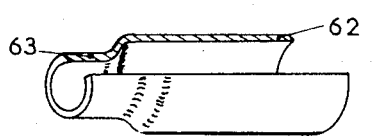
FIG. 18 shows, partially in section, a tube according to the invention provided with a neck at one end.
Figure 19:
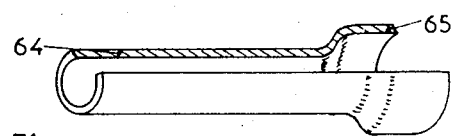
FIG. 19 is a similar view of a pipe with a flared skirt.

The inner wall 51 of the centrifuged mould shape 4 may be shaped so as to obtain in a single operation a cylindrical pipe 62 provided at one end with a neck 63, (FIG. 18). It may also be provided for producing a pipe 64 with a flared skirt at one end due to the presence of a connecting sleeve 65 of greater diameter.

The method according to the invention is partially based on the following considerations. It is known that at the beginning of the manufacturing process, it is necessary to place inside the shape 51 of the mould 4, a fabric or felt of glass fibers which is then impregnated with the mixture of resins which polymerize and harden, sprayed by the disc 23 of the arm 9. The positioning of this sheet of fabric or felt is known in moulds 4 whose shape 51 is a cylinder of revolution. On the other hand, one of the novelties according to the invention consists in using a shape 51 which is not a cylinder of revolution and of placing in it the sheet of felt of glass fibers which is put in place due to the automatic unwinding due to the rotation of the mould 4. It is stated that this unwinding takes place correctly when the fibers of the felt or fabric are dampened by the resin, and slide on each other, which makes the fabric or felt deformable. Naturally, when it is desired to produce a conical object 52, there is would in the mould 4 a sheet of fabric of fiber glass cut out according to the pattern of a circular sector.

Figure 15:
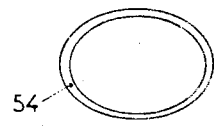
FIGS. 15 and 16 illustrate two other possible cross sections for hollow bodies centrifuged according to the invention.
Figure 16:
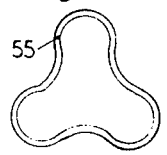

Practice has shown that winding the glass fiber reinforcement is correct, even for polygonal cross sections (FIG. 14) or any others (for example FIGS. 15 and 16).

If it is desired to obtain a constant thickness of wall 66, it will be seen that in the case of an object with a variable cross section (for example, for truncated objects 52 or for tubes 56, 62 and 64), it is necessary to vary the quantity of resins sprayed by the disc 23 along the axis 50 of the mould 4. In fact, in the example of FIG. 12, the quantity of resins to be sprayed in the region 67 near to the largest end of the cone frustum 52 is greater than that which is necessary near to the smaller end in a region 68 of the same axial length. This variation of the local amount of resin sprayed may be obtained according to the invention in two ways.

According to a first possibility, the nozzles (not shown) of the arm 9 which spray the resins onto the rotating disc 23 are supplied with a constant flow, whereas, on the other hand, the speed of movement forwards (arrow 11) and backwards (arrow 12) of the tube 9 are varied according to a given program. This variation of speed is linear in the case of a truncated object 52. It increases in successive degrees when passing from one to the other of the sections 59, 58, 57 of the object 56 illustrated in FIG. 17.

According to a second possibility, the speed of forwards or return movement of the arm is kept constant along the axis 50 of the mould 4, but, according to a predetermined program, the flow from the pumps which supply the rotating disc 23 with resins is varied.

Figure 20:
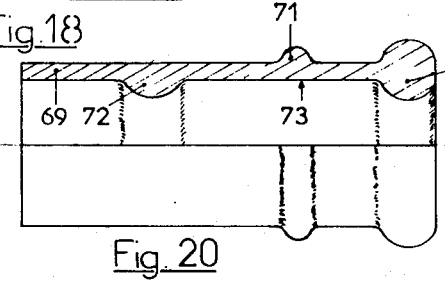
FIG. 20 is an elevation, partially in section, of a hollow body according to the invention, centrifuged with a variable thickness of wall.

Finally, this programmed variation of the speed of the arm 9 or of the flow from the pumps supplying the spray for the rotary disc 23 may be used even in the manufacture of tubes which are cylinders of revolution when one desires to vary locally the thickness of their wall. This case is illustrated in FIG. 20, where it can be seen that the invention makes it possible to manufacture by centrifugation, a tube 69 which is a cylinder of revolution provided with an end flange 70 and, locally, an outer transverse flange 71 and an inner transverse flange 72. In order to obtain this result, it is sufficient to provide in the inner wall of the cylindrical shape of the mould 4, two grooves corresponding to the part in relief of the flanges 70 and 71, the instantaneous flow of resins sprayed by the disc 23 then being calculated in order to:

produce internally a part in projection at the height of the flange 70;

define a uniform cylindrical wall 73 at the height of the external flange 71;

produce the inner flange 72 at the chosen level.

Naturally, one could combine in different ways the internal shape of the mould 4 and the variation of instantaneous flow sprayed by the rotating disc 23, depending on the shapes desired.

It will be noted that this variation of the cross section of the centrifuged objects or of the thickness of their wall is possible using the device according to the invention, although it would be totally impossible with machines of known type comprising, for example, a spout or gutter which is emptied by tilting it inside the mould 4, or even an endless conveyor belt which pours the resin into the centrifugal mould 4.

I claim:

1. Apparatus for manufacturing articles of synthetic plastic material by centrifugation, comprising a centrifugal mould, a tubular arm mounted for movement into and out of said mould on the axis thereof, carriage means supporting said arm for effecting said movement, at least two axially directed nozzles disposed at the front of said arm, a rotary disc located in spaced relation to the front of the arm and co-axial with the arm, a motor at the rear end of this arm for rotating the disc, circuit means for supplying the basic resins of a mixture which polymerizes and hardens to said nozzles under pressure whereby said resins will impinge on said rotary disc for centrifugal distribution onto the interior surface of said mould.

2. Apparatus as claimed in claim 1, wherein said circuit means for each nozzle comprises an electrically operated distribution valve connected to a supply under pressure of said basis resins.

3. Apparatus as claimed in claim 2 wherein the supply under pressure is provided by pressure chambers containing the resins.

4. Apparatus as claimed in claim 2 wherein the pressure is provided by a pump.

5. Apparatus as claimed in claim 1 wherein the motor for driving the disc is pneumatic.

6. Apparatus as claimed in claim 1 wherein the motor for driving the disc is electric.

7. Apparatus as claimed in claim 1 wherein the connection between the rotating disc and its motor is ensured by a flexible member extending inside the arm.

8. Apparatus as claimed in claim 1 wherein microswitches are arranged along the roller track for the carriage, these micro-switches being tripped by the carriage in order to initiate automatically the successive stages of the method.

9. Apparatus according to claim 1 wherein the arm supports two spray nozzles.

10. Apparatus according to claim 1 wherein the arm supports four spray nozzles.

11. Apparatus according to claim 1 wherein the nozzles for spraying the accelerated resins are all located on the same side of the vertical diametral plane of the arm, whereas all the nozzles for spraying the catalysed resins are arranged on the other side of this vertical plane.

* * * * *